May 7, 1963 W. B. KIRK 3,088,550
BRAKE BEAM WITH INTEGRALLY FORMED BRAKE CYLINDER
Filed May 12, 1961 3 Sheets-Sheet 1

INVENTOR.
Walter B. Kirk
BY
Attorney

May 7, 1963 W. B. KIRK 3,088,550
BRAKE BEAM WITH INTEGRALLY FORMED BRAKE CYLINDER
Filed May 12, 1961 3 Sheets-Sheet 2

INVENTOR.
Walter B. Kirk
BY
Attorney

May 7, 1963 W. B. KIRK 3,088,550
BRAKE BEAM WITH INTEGRALLY FORMED BRAKE CYLINDER
Filed May 12, 1961 3 Sheets-Sheet 3

INVENTOR.
Walter B. Kirk
BY
*A. A. Steinmeier*
Attorney

United States Patent Office 3,088,550
Patented May 7, 1963

3,088,550
BRAKE BEAM WITH INTEGRALLY FORMED
BRAKE CYLINDER
Walter B. Kirk, Pitcairn, Pa., assignor to Westinghouse Air Brake Company, Wilmerding, Pa., a corporation of Pennsylvania
Filed May 12, 1961, Ser. No. 109,775
6 Claims. (Cl. 188—52)

This invention relates to brake rigging for railway rolling stock and more particularly to a simplified type of brake rigging for freight cars characterized by brake beams having one or more brake cylinders directly associated therewith for effecting brake applying and brake releasing movement thereof.

In Patent No. 2,958,398, issued November 1, 1960, to George K. Newell and assigned to the assignee of the present application, there is shown and described a brake rigging, designed especially for freight cars, in which one or more brake cylinders are removably secured to one brake beam and are each provided with a piston having a piston rod which is operatively connected to another brake beam substantially parallel to the one brake beam, each brake beam being movable in a direction opposite to the other by the fluid pressure forces acting in opposite directions on the cylinders and their respective pistons.

The brake beams shown and described in the above-mentioned patent each have the shape of a standard channel, illustrated as a U-channel.

To construct from standard U-channels a brake beam for carrying one or more removably mounted deep drawn steel brake cylinder bodies in the manner described in Patent No. 2,958,398 requires considerable time and work on the part of skilled artisans, such as mechanics and welders. Consequently, the cost of manufacturing such brake beams is relatively high.

Moreover, since the deep drawn steel bodies of the brake cylinders secured to the brake beams of the foregoing type of brake rigging are located only a short distance above the level of the rails upon which the freight car travels, they are subject to flying ballast which is picked up from the railway roadbed by the vacuum created by the high speed of the freight car traveling along upon the rails. This flying ballast is capable of denting or bending the steel brake cylinder bodies inward to such an extent that the brake cylinder piston may bind therein and thus be unable to travel a full length of stroke. A brake cylinder body so damaged must be replaced with a new body and such replacement increases the cost of maintenance of railway rolling stock.

The present invention is a novel brake rigging in which the cost of manufacturing the rigging is reduced and in which replacement of brake cylinder bodies damaged by flying ballast is, to a great extent, made unnecessary by providing a combination of brake beam and brake cylinder body in which the brake cylinder body is cast integral with the brake beam and provided with a removable liner or bushing in which the brake cylinder piston is reciprocably slidably operable.

The invention further includes a novel arrangement for anchoring a liner within a brake cylinder body cast integral with a brake beam wherein the body is provided with two integral spaced-apart inwardly extending annular flanges which may be bored to the proper diameter to provide a press fit between the liner and the flanges. A third inwardly extending annular flange with an inside diameter less than the bored diameter of the other two flanges is provided whereby the third flange acts as a stop for one end of the liner when it is pressed into the other two spaced-apart inwardly extending flanges.

An additional feature of the invention resides in the fact that by using a liner press-fitted into a brake cylinder body cast integral with a brake beam, it is possible to use those castings wherein the brake cylinder body portion may have a limited amount of porosity and which are subject to leakage of fluid under pressure therethrough to atmosphere.

The cast brake beam and brake cylinder combination of the present invention thus simplifies and reduces the cost of manufacture thereof.

Also, by enabling the use of liners having the same outside diameter with different internal diameters, there is an additional practical advantage in that the railway car builders and the railroads need to purchase and stock in their storerooms only one form of brake beam and cylinder combination rather than a multiplicity of sizes thereof since, by installing a liner having the proper inside diameter, the same brake beam and cylinder combination may be used on freight cars having different requirements of piston sizes comformably to the weight of the cars.

In the accompanying drawings:

FIG. 5 is a vertical cross-sectional view, taken along the line 5—5 of FIG. 1 and looking in the direction of the arrows, showing the structural shape of the web and flanges of a brake beam intermediate the brake cylinder thereon and one end thereof.

*Description*

Figure 1:
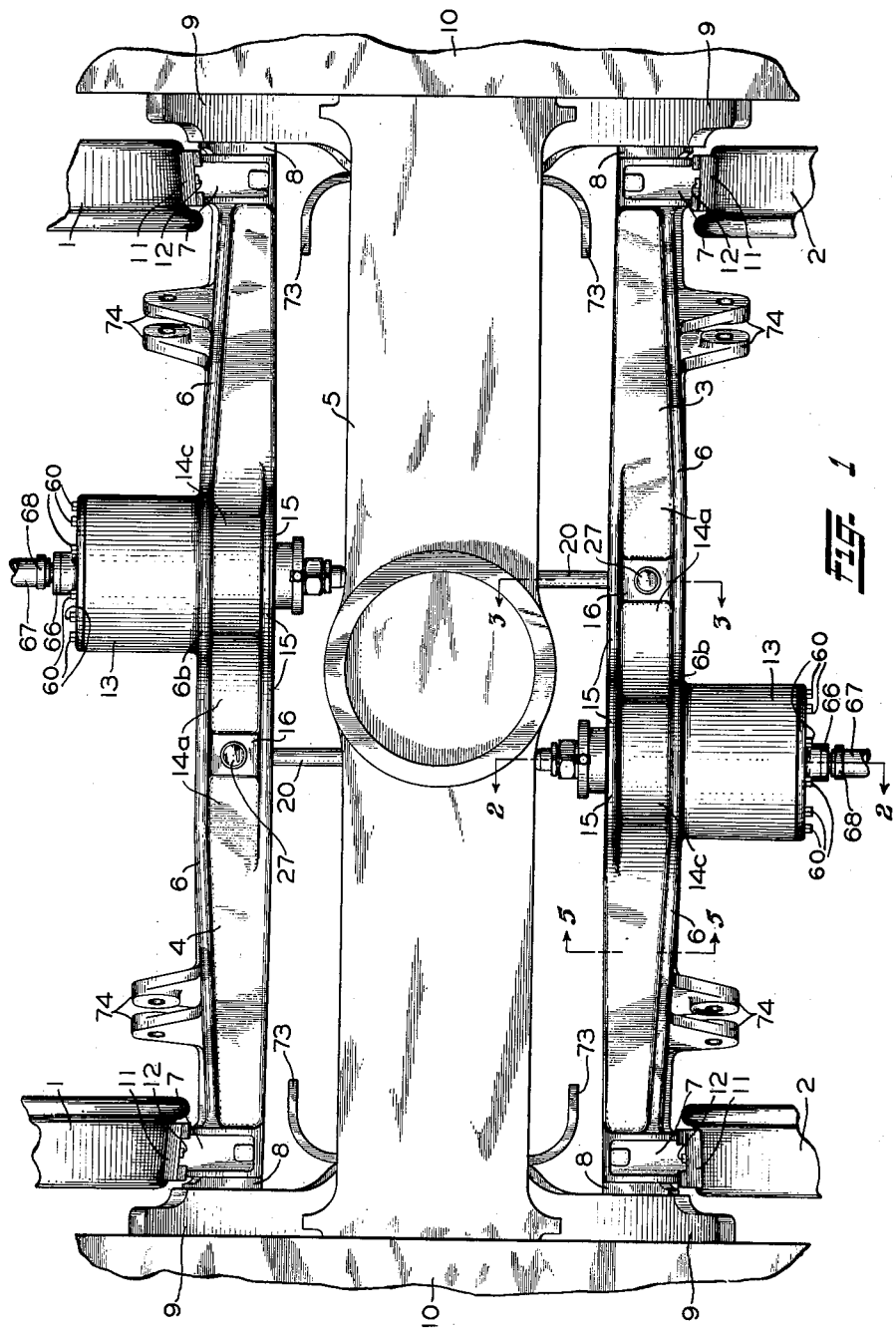
FIG. 1 is a plan view of a brake rigging for a four-wheel (that is, two-axle) car truck which rigging embodies the invention in which a single brake cylinder is cast or formed integral with each one of two brake beams.

Referring to FIG. 1 of the drawings, the reference numerals 1 and 2 designate respectively the wheels secured to opposite ends of each of two axles (not shown) of a two-axle four-wheel railway car truck.

The brake rigging shown in FIG. 1 comprises a pair of cast brake beams 3 and 4 extending crosswise of the car truck and in parallel spaced relation to each other and to a truck bolster 5. The brake beams 3 and 4 are symmetrically arranged on opposite sides of the truck bolster 5 and are movably supported at each end on the side frame members of the truck in a manner hereinafter described.

As shown in FIG. 5, the brake beams 3 and 4 each, in cross section, have generally the shape of a U-channel with the outer ends of the flanges thereof curved through an angle of substantially ninety degrees to form upper and lower ribs 6 and 6a respectively. Brake beams 3 and 4 are constructed, as hereinafter described, to provide a brake cylinder body that is cast integral with each of the respective brake beams.

A brake head 7 is cast integral with each of the brake beams 3 and 4 at each end thereof adjacent to and on the inboard side of one of a pair of guide feet 8 which are also cast integral with each of the respective brake beams at the opposite ends thereof. Each guide foot 8 is a flat generally L-shaped member, the outer leg of which is slidably supported in a grooved wear plate and guide member 9 which is secured to a truck side frame 10. The wear plate and guide members and the guide feet serve to support the brake beams 3 and 4 at the proper height above the rails (that is, somewhat below the horizontal diameter of the wheels), the groove in the wear plate and guide member 9 being at a slight angle to the horizontal to permit bodily movement of the brake beams in a direction radially of the associated wheels when a brake application is made.

Each brake head carries a "composition" type of brake shoe 11 for contact with the tread of an associated wheel. In this type of shoe the brake block is made of "composition" material having a relatively high and uniform friction characteristic, as compared to the relatively low and non-uniform friction characteristic of the older type "cast iron" brake shoe having a brake block of cast iron. In customary manner, each shoe 11 has a backing plate provided with a key bridge to receive a key 12 for removably locking the shoe to the brake head 7.

The brake shoes 11 are operated into and out of contact with their associated wheels, 1, 2 by means of a pair of fluid pressure motors or brake cylinders 13 which, according to the invention, are respectively cast integral with the cast brake beams 3 and 4. Each brake cylinder 13 is located intermediate the center and one end of the respective brake beams 3 and 4. Since each brake beam 3 and 4 and its one integrally cast brake cylinder 13 is identical, only the brake beam 3 will be described in detail.

As can be seen from FIGS. 1, 2, 4 and 5, a brake cylinder 13 is cast integral with and extends outward from a web portion 14 of the brake beam 3 in the same direction as the upper flange 14a and the lower flange 14b of the brake beam, it being understood that the upper and lower flanges of the brake beams at the location of the brake cylinder are respectively expanded as shown at 14c and 14d respectively (FIG. 4) and are connected by two web portions 14e respectively to form a cylinder having an outside diameter that is slightly less than that of the brake cylinder 13. Likewise, the ribs 6 and 6a of each of the brake beams 3 and 4 are expanded so that they form corresponding outwardly extending flanges or ribs 6b and 6c respectively on the outside or periphery of the respective brake cylinder.

Figure 2:
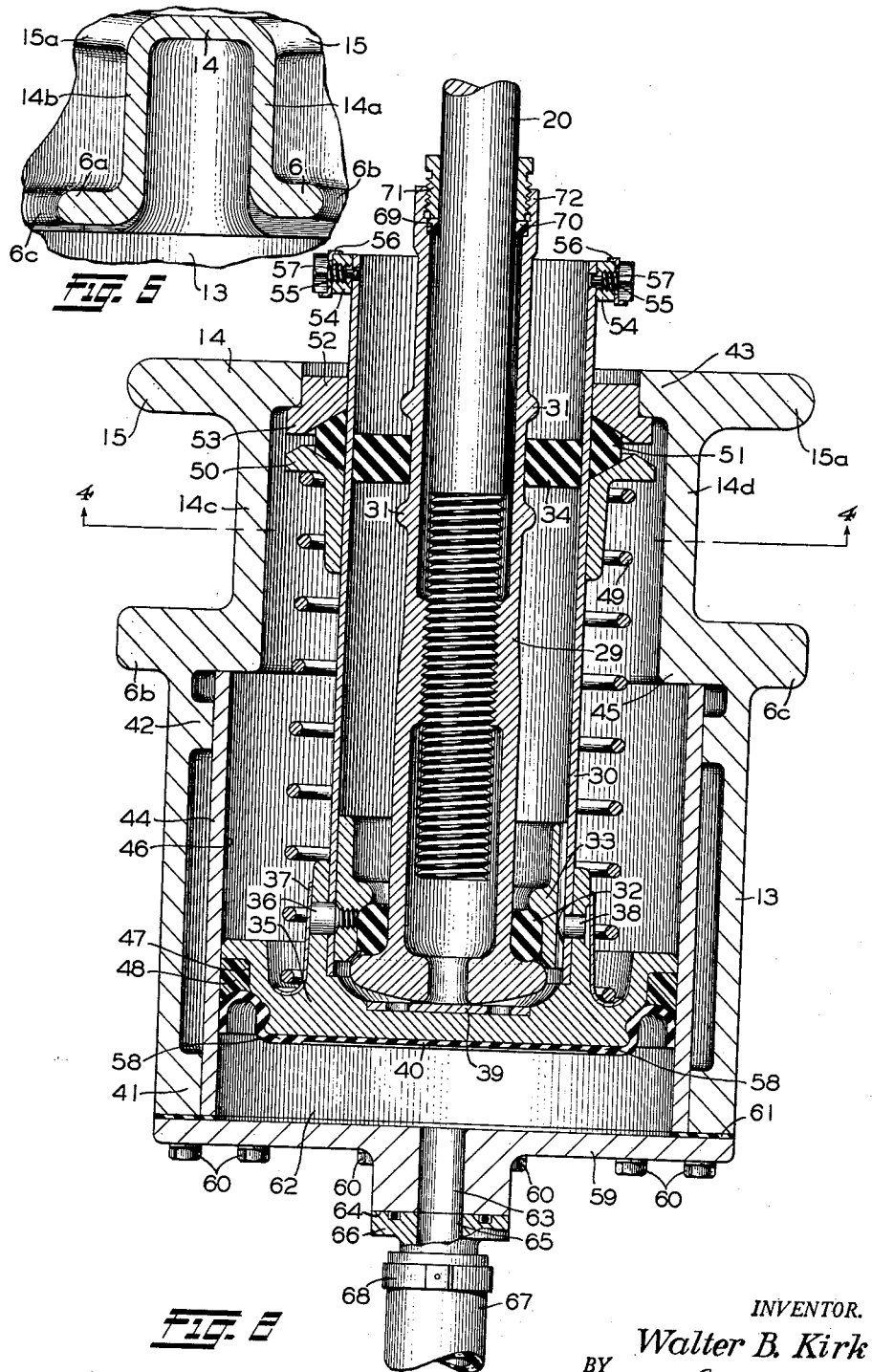
FIG. 2 is a vertical cross-sectional view, on an enlarged scale, taken along the line 2—2 of FIG. 1 and looking in the direction of the arrows, showing further details of construction.
Figure 4:
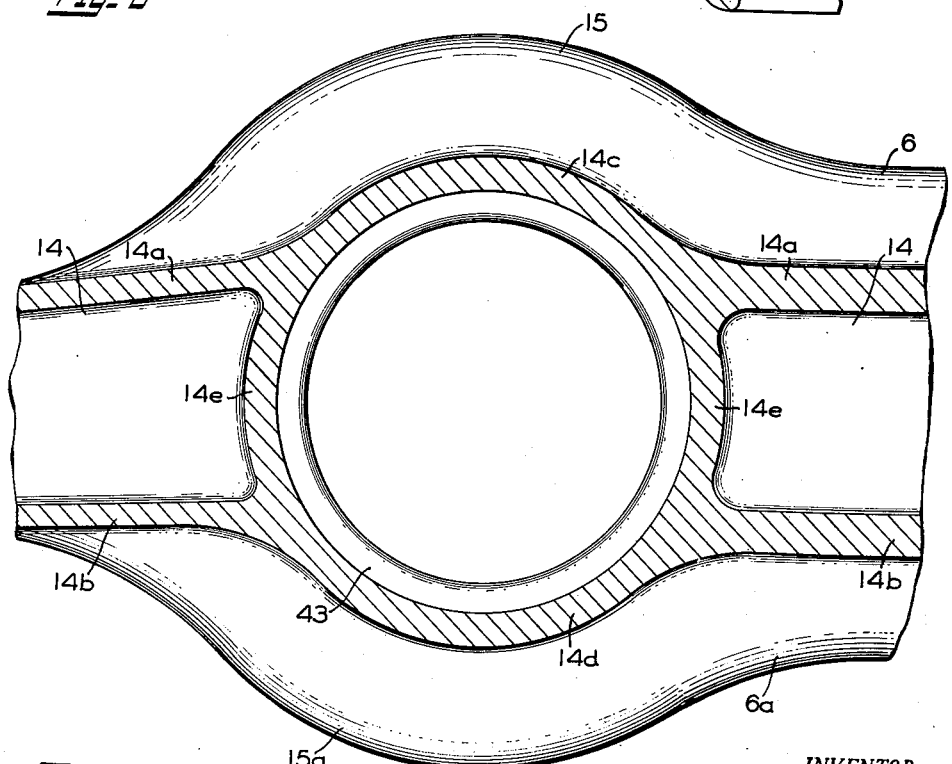
FIG. 4 is a vertical cross-sectional view, taken along the line 4—4 of FIG. 2 and looking in the direction of the arrows, showing structural details of how the brake cylinder is cast integral with the web and flanges of the brake beam and with the piston and hollow rod assembly omitted for sake of clarity.

Also, as shown in FIGS. 1, 2 and 4, on the web side of the U-channels constituting the brake beams 3 and 4 and extending outward from the outside faces of the respective expanded flanges 14a and 14b of these U-channels are a second pair of peripheral ribs 15 and 15a, only the upper rib 15 appearing in FIG. 1. The inside face of each rib 15 and 15a is spaced from corresponding ribs 6b and 6c a distance that is substantially equal to the width of the respective flanges less the thickness or width of the two corresponding ribs. These ribs 15 and 15a also extend a chosen distance along the outside edge of the respective upper and lower flanges on one side of the brake cylinder.

Figure 3:
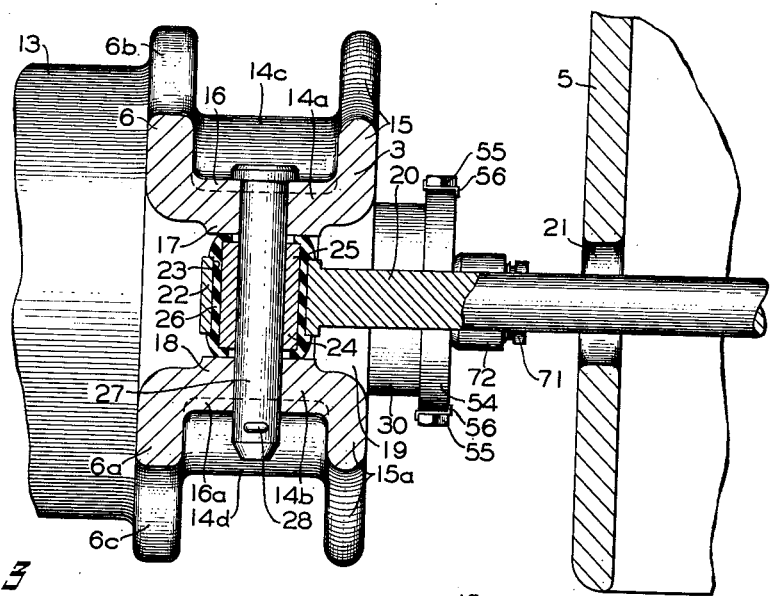
FIG. 3 is a vertical cross-sectional view, on an enlarged scale taken along the line 3—3 of FIG. 1, showing details of the pivotal connection between the piston rod of the brake cylinder carried by one brake beam and the other brake beam.

As shown in FIGS. 1 and 3, the upper side of upper flange 14a of each of the brake beams 3 and 4 has cast integral therewith a raised portion or web 16 which extends transverse the respective beams between the ribs 6 and 15, the height of web 16 being considerably less than the height of ribs 6 and 15 as clearly shown in FIG. 3. Likewise, the lower side of lower flange 14b of each of the brake beams has cast integral therewith a web 16a which is identical in construction to the web 16 except that it extends in an opposite direction.

Formed on the lower side of upper flange 14a directly beneath the web 16 is a boss 17 and formed on the upper side of lower flange 14b directly above the web 16a is a boss 18. The web portion 14 of each of the brake beams adjacent the bosses 17 and 18 thereof is omitted to form an opening 19 through which extends the exterior portion of a push rod 20 of the brake cylinder carried by the other brake beam, which push rod also extends through suitable openings 21 in the bolster 5, only one of such openings being shown in FIG. 3.

The exterior end of each push rod 20 has formed thereon a boss 22, the thickness or height of which, as clearly shown in FIG. 3, is less than the vertical distance between the bosses 17 and 18. The boss 22 on the exterior end of each of the push rods 20 has a bore 23 extending vertically therethrough. A bushing 24 is disposed in the bore 23 in the boss 22 of each push rod 20, the bushings 24 each comprising a metallic inner sleeve 25 to which is bonded a resilient outer sleeve 26 of some suitable material such as rubber. The length of the inner sleeve 25 is greater than the thickness of the boss 22 and less than the vertical distance between the two oppositely disposed bosses 17 and 18, as clearly indicated in FIG. 3. The free length of the outer resilient sleeve 26 is somewhat greater than the vertical distance between the bosses 17 and 18 so that the opposite ends thereof are compressed when the boss 22 on the exterior end of each push rod 20 is inserted between corresponding bosses 17 and 18. This compression of the resilient material comprising the outer sleeves 26 causes a so-called "flow" of this material so that it extends slightly inward over the opposite ends of the inner bushing 25 and slightly outward the opposite faces of the boss 22, as shown in FIG. 3, when each boss 22 occupies its assembled position in which it is shown in FIG. 3.

The above-described construction provides a resilient pivoted connection between the push rod of the brake cylinder of one brake beam and the other brake beam to prevent undue noise and wear of the faces of the bosses 17, 18 and 22 as a result of vibration encountered when a railway car is traveling at high speed.

The boss 22 on the exterior end of each push rod 20 is pivotally connected to its respective brake beam as by a pin 27 which extends through the inner sleeve 25 of bushing 24 and coaxial bores in each of the bosses 17 and 18, corresponding flanges 14a and 14b, and corresponding webs 16 and 16a. Each pin 27 is retained in place by a cotter pin 28 shown in FIG. 3.

Referring to FIG. 2, it will be seen that the opposite end of each push rod 20 is screw-threaded and has screw-threaded engagement with a push rod end member 29 that is disposed in a hollow rod 30. The purpose of providing a screw-threaded connection between the push rod 20 and the push rod end member 29 is to enable the length of the push rod 20 to be increased, as required, following reduction in diameter of the wheels 1 and 2 of the truck due to returning and/or wheel wear.

Intermediate its ends, the push rod end member 29 is provided on its periphery with two longitudinally spaced-apart ribs 31. The push rod end member 29 is supported adjacent the end thereof within the hollow rod 30 by a resilient anti-rattler ring 32 disposed within a push rod end keeper 33 and also by a piston rod sealing ring 34 disposed in surrounding relation thereto and located between the ribs 31. The end keeper 33 is rigidly secured to the hollow rod 30 and to a piston 35 by means of a plurality of circumferentially spaced pins 36, only one of which is shown in FIG. 2, which pins are threaded at one end for screw-threaded engagement with corresponding threaded bores in the end keeper. The pins 36 are retained against working loose by vibration encountered when a railway car truck travels along a track at high speeds by a pin retainer ring 37 that is disposed in surrounding relation to the outer unthreaded ends of the pins. The hollow rod 30 is also secured to the piston 35 by means of a plurality of circumferentially spaced rivets 38, only one of which is shown in FIG. 2.

The piston 35 is made from an aluminum casting. Therefore, in order to prevent undue wear of the piston 35 by the end of the push rod end member 29, a steel wear plate 39 is cast integral with the aluminum piston.

A packing cup 40, illustrated as of the snap-on type, is secured to the pressure face of the piston 35.

Cast integral with each brake cylinder 13 and its respective brake beam are three inwardly extending spaced-apart annular flanges 41, 42 and 43. The flanges 41 and 42 are machine bored to receive with a press fit a bushing or liner 44 one end of which, when pressed into place, rests against a shoulder 45 which acts as a stop for the bushing. The opposite end of the bushing is flush with a flat face formed by machining the outer face of flange 41 at the end of the brake cylinder 13.

The bushing 44 has a bore 46 extending therethrough in which is slidably mounted the piston 35. In order to prevent undue wear of the periphery of the aluminum piston 35 due to vibration, the piston 35 is provided with an annular groove 47 in which is received a plastic ring member 48, the outer periphery of which contacts the surface of the bore 46.

A caged release spring 49 is interposed between a flange formed on the pin retainer ring 37 and an annular spring seat 50 that is disposed in surrounding relation to the hollow rod 30. A resilient hollow rod packing seal 51 surrounds the hollow rod 30 and is interposed between the spring seat 50 and an annular ring 52 which also surrounds the hollow rod 30 and has a collar 53 that rests against the inside surface of the inwardly extending annular flange 43. A push rod holder 54 is secured to the exterior end of the hollow rod 30 by means of a pair of push rod holder set screws 55 and a pair of push rod holder lock washers 56 interposed between the heads of the set screws and the exterior surface of the push rod holder. The set screws 55 have a threaded portion for threaded engagement with a corresponding threaded bore in the push rod holder 54 and a reduced unthreaded end portion that extends into a corresponding bore 57 formed in the hollow rod 30 adjacent the exterior end thereof.

The release spring 49 serves to yieldingly bias the piston 35 in a brake release direction from a brake applied position in which the piston is shown in FIG. 2 of the drawings to a release position in which several lugs 58, only two of which are shown in FIG. 2, formed on the side of the packing cup 40 opposite the piston 35 contacts a pressure head 59.

The pressure head 59 is secured to that end of the brake cylinder 13 having the flange 41 by means of a plurality of angularly spaced cap screws 60 that extend through a plurality of angularly spaced unthreaded bores in the pressure head 59 and have screw-threaded engagement with corresponding threaded bores in the brake cylinder 13. A resilient gasket 61 is interposed between the end of the brake cylinder 13 and the pressure head 59 to provide a seal therebetween and thus form a pressure chamber 62 between the packing cup 40 and pressure head 59 to which chamber fluid under pressure may be supplied through a passageway 63 extending through the pressure head 59. The passageway 63 opens at a flat face 64 machined on the pressure head 59 and registers with a passageway 65 formed in a flange fitting 66 secured to the face 64 of the pressure head 59 by a pair of cap screws (not shown). The passageway 65 in the flange fitting 66 may be connected through a flexible hose 67 having one end secured to the flange fitting by a hose clamp 68, to the brake cylinder pipe leading from the usual brake controlling valve device (not shown) of the air brake system on railway freight cars.

In order to prevent the entrance of moisture into the interior of the push rod end member 29 where it could cause rusting of the internal and external threads of the respective push rod end member 29 and the push rod 20, the exterior end of the push rod end member 29 is provided with a counterbore 69 in which is disposed an O-ring seal 70 that surrounds the push rod 20 to form a seal therewith. A portion of the counterbore 69 is screw-threaded to receive a hollow threaded retainer nut 71 that surrounds the push rod 20 and retains the O-ring seal 70 in the counterbore 69. The exterior end of push rod end member 29 is provided with a polygonal collar 72 for receiving an open end wrench whereby the push rod end member 29 can be held against rotation when the hollow retainer nut 71 is tightened into the threaded portion of the counterbore 69.

During the life of a railway car wheel, the diameter of the wheel may be reduced up to 3½ inches as the result of tread wear and re-turning of the wheel. Accordingly, as the diameter of the wheels is reduced, in order to maintain a standard clearance of 1½ inches between the tread of the wheel and the face of a corresponding brake shoe when the brakes are released, a flat leaf spring member 73 (FIG. 1) made from spring steel is secured by rivets (not shown) to each of the wear plate and guide members 9 at a location substantially midway the length thereof. Each end of each leaf spring member is curved or bent to form an arc of substantially ninety degrees and serves at a limit stop to movement of the corresponding end of one of the brake beams toward the bolster 5. Therefore, whenever a wheel and axle assembly on a railway car truck is replaced by another, the diameter of the wheels of which differ appreciably from the diameter of the wheels removed, the corresponding ends of the leaf spring members 73 can be adjusted by manually bending, as by means of a hammer, to a degree in accordance with the difference in the diameter of the old and new wheels. By manually adjusting the ends of the leaf spring members 73 in the manner just described, the release position of the brake beams 3 and 4 can be changed to insure that, upon the opposite ends of the respective brake beams contacting the corresponding ends of the leaf spring members 73, the proper clearance between the brake shoes and the treads of the corresponding wheels is obtained.

In order to provide in customary fashion for operation of the brake beams by hand brake means, two pair of lugs 74 are cast integral with each of the brake beams 3 and 4. One end of a lever of any suitable hand brake rigging (not shown) can be connected to either pair of lugs on each brake beam to provide for a brake application by manual operation of the hand brake rigging.

In operation, when it is desired to effect a fluid pressure brake application, fluid under pressure is admitted simultaneously to the pressure chamber 62 in each of the brake cylinders 13 through the flexible hose 67, which is connected to the brake controlling valve device of the usual air brake system on railway freight cars, passageway 65 and passageway 63. Fluid under pressure thus supplied to the chamber 62 formed beween the piston 35 and the pressure head 59 of each brake cylinder 13 is effective to move the pistons 35 and the cylinders 13 in opposite directions. As the pistons 35 and cylinders 13 are moved in opposite directions, the brake beams 3 and 4 also move in opposite directions since the piston 35 of one brake cylinder 13 cast integral with brake beam 3 is connected through one push rod 20 to the brake beam 4 and the piston 35 of the other brake cylinder 13 cast integral with the brake beam 4 is connected through the other push rod 20 to the brake beam 3. As the brake beams move in opposite directions, the brake shoes carried by the beams are brought into braking contact with the wheels of the truck to effect a braking action on the wheels.

As the brake beams 3 and 4 are moved, as described above, these beams are supported and guided by the guide feet 8 as these feet have sliding contact in the grooves in the wear plate and guide members 9. The orientation of the wear plate and guide members 9 is such that the brake beams 3 and 4 and the brake shoes 11 carried thereby are moved radially toward the wheels.

It will be understood that in view of the symmetrical disposition of the brake cylinders on the two brake beams each on opposite sides of the longitudinal axis of the truck and the corresponding symmetrical relation of the points at which the piston rods are anchored to the two brake beams, the simultaneous supply of fluid at the same pressure to the pressure chambers 62 of both brake cylinders produces substantially equalized forces of application of the brake shoes to the wheels.

When it is desired to release the brake application, the fluid under pressure supplied to chamber 62 of both brake cylinders 13 is vented in the usual manner to atmosphere through the passageways 63 and 65, and flexible hose 67 under the control of the usual brake controlling valve device of the car brake system, whereupon the force of each spring 49 acting on the spring seat 50 moves the corresponding brake cylinder 13 and its piston 35 in a brake releasing direction to move the brake beams toward each other and the brake shoes correspondingly away from the tread surface of the wheels of the truck to effect a brake release.

Due to the inclination of the grooves in the wear plate and guide members 9, the brake beams tend to return by action of gravity to their normal symmetrical relation with respect to the truck bolster, in which position the clearance between the brake shoes on one brake beam and their associated wheels is substantially equal to the clearance between the brake shoes on the other brake beam and their associated wheels. The clearance between the brake shoes and their associated wheels when the brake beams have returned to their release position is determined by the position of the corresponding bent ends of the leaf spring members 73.

It will be noted that it is not necessary to use a slack adjuster with this type of rigging. Since there are no links or levers between each of the brake cylinders and the brake beams of the present invention, there can be no wear therein which must be compensated for by a slack adjuster as in conventional brake rigging. It should be understood that the length of the bore in the casing of cylinders 13 is such as to provide sufficient travel for the pistons 35 in addition to that required to effect contact of the brake shoes with the wheel treads, that as the brake shoes 11 wear away, the shoes are always properly moved into braking contact with the wheels of the truck during each brake application throughout their useful life without the necessity of a slack adjuster to compensate for wear of the shoes.

Having now described the invention, what I claim as new and desire to secure by Letters Patent is:

1. A brake beam of cast construction comprising a flat web having longitudinal flanges at opposite edges thereof to form a U-shaped channel, a longitudinally extending rib on the free end of each flange on the side thereof opposite said web, said flanges and said ribs being arcuately curved for a portion of their length between one end of the brake beam and a point midway the length thereof, a pair of arcuate webs cast integral at one end thereof with said flat web and extending transversely between said flanges therefrom in the same direction as said flanges, the opposite edges of said arcuate webs being cast integral therewith and connecting corresponding ends of the arcuately curved portions of said flanges, and a brake cylinder body disposed substantially perpendicular to the longitudinal axis of the brake beam and having one end open and the other end cast integral with said arcuate webs and with the arcuately curved portion of said flanges.

2. A brake beam, as claimed in claim 1, further characterized in that the wall of said brake cylinder body is provided internally with two radially inward extending annular flanges respectively adjacent opposite ends of said brake cylinder body, and also in that said brake cylinder body is provided with a cylindrical bushing supported coaxially within said brake cylinder body by said annular flanges, and a pressure head removably secured to the open end of said brake cylinder body.

3. A brake beam, as claimed in claim 1, further characterized in that said brake cylinder body is provided with two radially inward extending annular flanges located respectively adjacent opposite ends of said brake cylinder body, and also in that a piston-carrying cylindrical bushing is supported coaxially within said brake cylinder body by said annular flanges such that the exterior portion of said bushing between said flanges is spaced from the interior surface of the wall of said brake cylinder body.

4. A brake beam of cast construction comprising a flat web having longitudinal flanges at opposite edges thereof to form a U-shaped channel, said flanges being expanded for a portion of their length between one end of the brake beam and a point midway the length thereof to form an arc, a pair of arcuate webs cast integral with said flat web and extending therefrom in the same direction as said flanges, the opposite edges of which arcuate webs being cast integral with and connecting corresponding ends of the expanded arcuate portions of said flanges to form a generally cylindrical member, and a brake cylinder body having one end open and the other end cast integral with said arcuate webs and with the arcuate portions of said flanges, said flat web having an opening therethrough coaxial to the generally cylindrical web formed by said arcuate webs and said expanded arcuate portions of said flanges.

5. A unit brake beam for use in a brake rigging for a four-wheel type of railway vehicle truck having a transverse axis and a longitudinal axis perpendicular thereto, which brake rigging embodies two brake-cylinder-carrying unit brake beams extending in spaced parallel relation to the transverse axis of the car truck for bodily movement longitudinally of the truck, the piston rod of the brake cylinder carried by one brake beam being operatively connected to the other brake beam; said unit brake beam comprising a cast U-shaped channel having a flat web and a pair of longitudinally extending flanges cast integral with the respective edges of the flat web, said flanges being expanded for a portion of their length between one end of the brake beam and a point midway the length thereof to form an arc, a brake cylinder body having one end cast integral with said flat web and said expanded portion of said flanges, and a pair of coaxial and oppositely facing bosses formed respectively on the inner surfaces of the longitudinally extending flanges at a point between the other end of the brake beam and the point midway the length thereof, said flanges and bosses having coaxial bores transversely therethrough for receiving a pin by which the exterior end of the piston rod of a brake cylinder carried by another unit brake beam may be pivotally connected thereto.

6. A unit brake beam as claimed in claim 5, further characterized in that the longitudinal axis of the brake cylinder and the axis of said coaxial bores are substantially symmetrically spaced on opposite sides respectively with respect to the mid-point of the brake beam.

References Cited in the file of this patent
UNITED STATES PATENTS

| 434,874 | Lawrence | Aug. 19, 1890 |
| 655,376 | Schaffer et al. | Aug. 7, 1900 |
| 2,783,749 | Effmann | Mar. 5, 1957 |
| 2,940,545 | Hursen | June 14, 1960 |
| 2,958,398 | Newell | Nov. 1, 1960 |

OTHER REFERENCES

Brochure Wabcopac Brake Assembly, September 1957, inside pages, Westinghouse Air Brake Company, Air Brake Div., Wilmerding, Pa.